May 2, 1950 S. RZEPELA 2,506,110
ECCENTRIC DRIVE GEAR
Filed Sept. 10, 1948
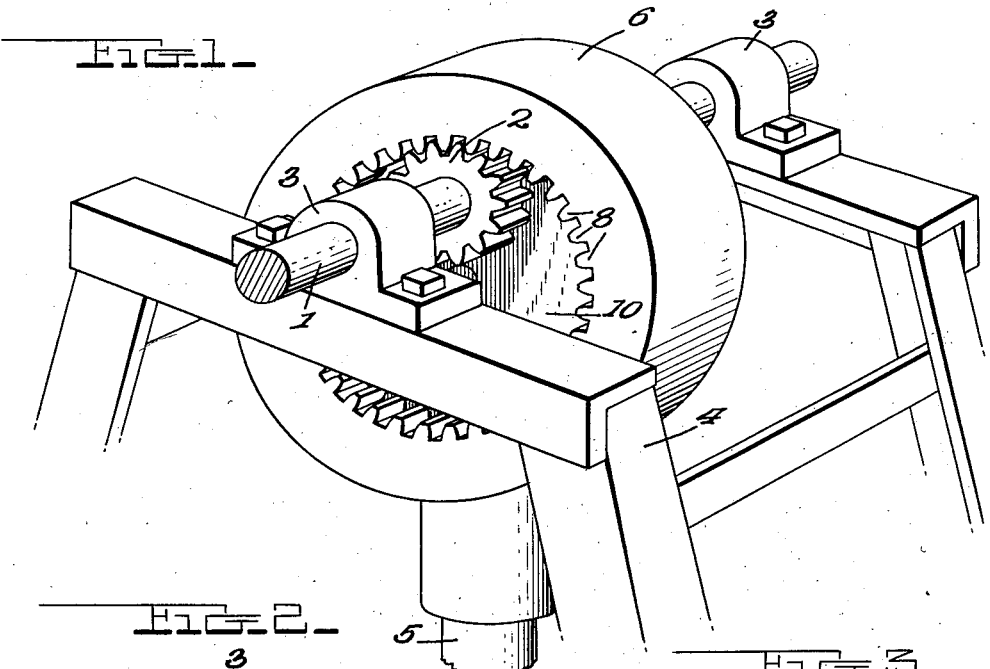
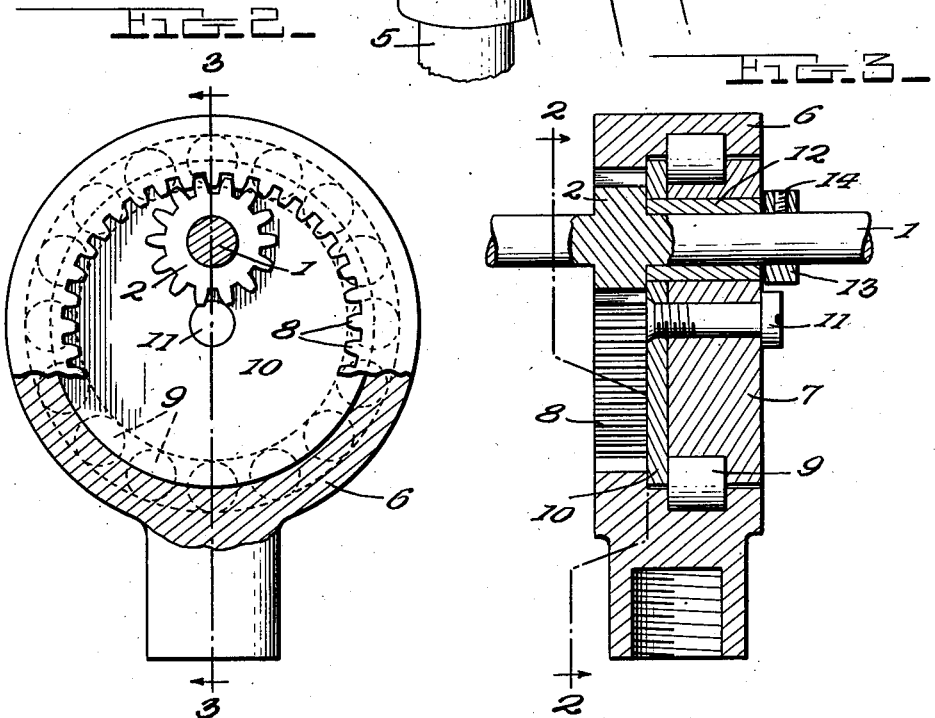
INVENTOR.
Stanley Rzepela,
BY
Bryant & Lowry
attys.

Patented May 2, 1950

2,506,110

UNITED STATES PATENT OFFICE 2,506,110

ECCENTRIC DRIVE GEAR

Stanley Rzepela, Philadelphia, Pa.

Application September 10, 1948, Serial No. 48,636

2 Claims. (Cl. 74—52)

The present invention relates to means for transmission of power from a rotating drive shaft to a reciprocating and oscillating connecting rod, or vice versa.

The normal means for the transmission of such power is by an eccentric or crank pin rigidly fixed to the shaft and rotatably mounted in a bearing in the end of the connecting rod. In all such cases, the speed of rotation of the shaft is equivalent to the speed of reciprocation and oscillation of the connecting rod. It is advantageous, however, to have transmission means between a rotating shaft and a connecting rod which will provide reduced speed to the connecting rod with relation to the speed of the shaft.

The object of the present invention is to provide a transmission means having such advantage.

Another object is to construct a transmission device between a rotary shaft and a connecting rod linked thereto for operating at reduced speeds relative to the shaft.

Another object is to construct an eccentric drive gear for a connecting rod comprising an eccentric for said connecting rod bearing, said eccentric being rotatably mounted on the drive shaft, which is provided with a pinion meshing with a ring gear formed integrally on said connecting rod bearing.

Other and more specific objects will become apparent in the following detailed description of one form of the present invention, as illustrated in the accompanying drawing, in which:

Figure 1 is a perspective view of the eccentric drive gear mounted on a supporting frame, Figure 2 is an end view of the eccentric drive gear, shown partly in section along the line 2—2 of Figure 3, and Figure 3 is a sectional view taken on the line 3—3 of Figure 2.

The eccentric drive gear illustrating the present invention comprises a drive shaft 1 having a pinion 2 fixed thereon and mounted in bearings 3 on support frame 4. A connecting rod 5 has a bearing ring 6 rotatably mounted on eccentric 7 which is rotatably mounted on shaft 1 so that the pinion 2 meshes with an internal ring gear 8 which is integral and coaxial with the connecting rod bearing 6.

A roller race and rollers 9 are provided between the eccentric 7 and the bearing 6 to reduce friction, although any other type of bearing, such as ball or just a plain bearing, could be used. The rollers 9 are held in the race 10 of the eccentric 7 by end plate 10 which is held in place by round headed screw bolt 11, the end of which is swaged to fix it against accidental loosening during operation. A bushing 12 is used in the eccentric 7 to provide a bearing for the shaft 1. A retainer ring 13, held by a lock screw 14 on shaft 1, is used to fix the parts axially in operative relation.

Thus when power is applied by turning the shaft 1, and since the connecting rod 5 is restricted against turning about the eccentric 7 and shaft 1, the eccentric 7 is caused to rotate on shaft 1, as pinion 2 travels around the internal ring gear 8, causing the connecting rod bearing ring to move eccentrically about the shaft at a rate reduced with respect to the rate of rotation of shaft 1, in proportion to the ratio of pitch diameters of the ring gear and pinion. In the present illustration, this ratio is 2½. The shaft 1 therefore makes two and one-half revolutions to each revolution of the eccentric. This gives an equivalent mechanical advantage to the torque exerted by the eccentric with respect to the torque applied to the shaft 1.

An eccentric drive gear of this type is adaptable for driving a large variety of devices, such as power presses, pumps, and other reciprocating mechanisms where a reduction of speed or an increased force is desirable in the driven means.

Obviously, many modifications in details, some of which have been pointed out above, may be made without departing from the spirit and scope of this invention, as defined in the appended claims.

What is claimed, is:

1. An eccentric drive gear comprising a drive shaft, a pinion gear concentric therewith, a bushing surrounding said shaft, an eccentric on said bushing rotatable on said shaft, a bearing race surrounding said eccentric, bearings in said race, a connecting rod bearing ring surrounding said race, a connecting rod secured to said connecting rod bearing ring, a ring gear coaxial with said bearing ring in mesh with said pinion gear; an end plate secured to said eccentric between said eccentric and said pinion gear to retain said bearings in said race, and a retainer ring secured to said shaft to secure the assembly against axial displacement.

2. The construction of claim 1 wherein the securing means between the eccentric and the end plate comprises a screw having a flush-swaged end adjacent the pinion teeth to provide minimum friction.

STANLEY RZEPELA.

REFERENCES CITED

The following references are of record in the file of this patent:

UNITED STATES PATENTS

| Number | Name | Date |
|---|---|---|
| 1,863,667 | Miranda | June 21, 1932 |
| 2,316,114 | Thompson | Apr. 6, 1943 |
| 2,460,428 | O'Leary | Feb. 1, 1949 |